US012488373B2

(12) United States Patent
James

(10) Patent No.: US 12,488,373 B2
(45) Date of Patent: Dec. 2, 2025

(54) METHOD, MEDIUM, AND SYSTEM FOR COMPARING PRODUCT OFFERS

(71) Applicant: SARONIKOS TRADING AND SERVICES, UNIPESSOAL LDA, Madeira (PT)

(72) Inventor: Robert James, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 123 days.

(21) Appl. No.: 18/152,097

(22) Filed: Jan. 9, 2023

(65) Prior Publication Data

US 2023/0162256 A1    May 25, 2023

(51) Int. Cl.
*G06Q 30/00*    (2023.01)
*G06F 16/955*    (2019.01)
*G06Q 30/0601*    (2023.01)

(52) U.S. Cl.
CPC ..... *G06Q 30/0629* (2013.01); *G06F 16/9554* (2019.01); *G06Q 30/0611* (2013.01); *G06Q 30/0633* (2013.01)

(58) Field of Classification Search
CPC ............ G06F 16/9554; G06Q 30/0611; G06Q 30/0633; G06Q 30/0629
See application file for complete search history.

(56) References Cited

U.S. PATENT DOCUMENTS 5,918,211 A    6/1999  Sloane
9,779,442 B1 * 10/2017  Cimic ................ G06Q 30/0643

2002/0002504 A1    1/2002  Engel
2004/0073572 A1 *  4/2004  Jiang ...................... G06Q 10/08
2005/0273396 A1 * 12/2005  Aliabadi ............ G06Q 30/0601
705/26.1

(Continued)

FOREIGN PATENT DOCUMENTS

WO    2005/122021 A1    12/2005

OTHER PUBLICATIONS

Ding, Li, et al. "Swoogle: a search and metadata engine for the semantic web." Proceedings of the thirteenth ACM international conference on Information and knowledge management. (Year: 2004).*

(Continued)

*Primary Examiner* — Matthew E Zimmerman
(74) *Attorney, Agent, or Firm* — Workman Nydegger

(57) ABSTRACT

An apparatus and a method for comparing product offers, wherein the apparatus includes acquisition components able to receive product identification information collected from or transmitted by a product and/or a product tag positioned on or close to the product, and control and/or processing components configured for receiving, through the acquisition components, the product identification information relating to the product, generating a request of product information on the basis of the product identification information, transmitting the request of product information to at least a device that is configured to generate, on the basis of the request of product information, a product information response comprising at least a set of offers relating to the product, receiving the product information response generated by the device, and displaying the at least one set of offers.

9 Claims, 3 Drawing Sheets

(56) References Cited

U.S. PATENT DOCUMENTS

| | | | |
|---|---|---|---|
| 2010/0082447 A1* | 4/2010 | Lin | G06Q 30/0601 |
| | | | 705/26.1 |
| 2012/0022965 A1* | 1/2012 | Seergy | G06Q 30/0639 |
| | | | 705/26.4 |
| 2012/0158482 A1 | 6/2012 | Paradise et al. | |
| 2015/0112838 A1* | 4/2015 | Li | G06Q 30/0623 |
| | | | 705/26.61 |
| 2015/0140982 A1 | 5/2015 | Postrel | |
| 2016/0247213 A1* | 8/2016 | Lee | H04L 51/04 |

OTHER PUBLICATIONS

Ding, Li, et al. *Swoogle: A Search and Metadata Engine for the Semantic Web*, Proceedings of the Thirteenth ACM International Conference on Information and Knowledge Management, (Year: 2004), pp. 1-8.

* cited by examiner

METHOD, MEDIUM, AND SYSTEM FOR COMPARING PRODUCT OFFERS

CROSS-REFERENCE TO RELATED APPLICATIONS

This application is a continuation of U.S. application Ser. No. 16/306,478, filed Nov. 30, 2018, which is a nationalization of PCT Application No. PCT/EP2016/062597, filed Jun. 30, 2016, which are incorporated herein in their entirety by specific reference.

BACKGROUND OF THE INVENTION

1. The Field of the Invention

In its most general aspect, the present invention relates to an apparatus and a method for comparing product offers, in particular sale offers relating to the same or similar products.

2. The Relevant Technology

Today, a consumer has the possibility to buy products in different ways, mainly in regular shops or online shops. It is well-know that the sales conditions (e.g., warranty conditions, delivery time, price, financing, etc.) applied from these shops differ from one another.

The selling price of the products is mainly influenced by these conditions, the expected selling volumes, and the supplying strategies (e.g., type of supply channel, number of intermediaries, etc.).

These factors may produce very large differences of the sales price of a product (e.g., 30-40%), in particular the prices may vary a lot between online shop and regular shop, especially in certain periods, e.g., during a product launch campaign, at the end of a season, when a product is going to be substituted by a new one, or in other similar situations.

When a consumer is in a regular shop (e.g., a supermarket, a mall, or the like) and wants to do an informed buying choice, the consumer has to compare several sales offers relating to the same product or a similar one. For doing that, the consumer has firstly to identify the product that wants to buy (usually the one in front of him/her); this task is not trivial, especially when the product is an electronic appliance such as a food processor, a microwaves oven, a personal computer, or the like, because these products are often sold in different variants and/or with a large number of accessories (e.g., food preparation tools, food containers, memory modules, devices, and the like) which may influence the sales price in a considerable way.

After having identified the product, the consumer is able to retrieve (e.g., through Internet) the sale offers relating to a particular product (or similar ones), so he/she can perform an informed buying choice based on said retrieved sale offers. This process usually requires a certain amount of time and cannot be done by an average consumer during a regular shopping session, since this process requires a personal computer (connected to the Internet) on which the user can open several Internet pages through an Internet browser software, and execute a word processor and/or a spreadsheet software for noting his/her findings (e.g., the product price, features, etc.) about the product that he/she is interested in buying.

SUMMARY OF THE INVENTION

The present invention aims to solve these and other problems by providing an apparatus and a method for comparing product offers.

The main idea of the present invention is the collection of product identification information which allow to identify a product (preferably uniquely), the use of said product identification information for retrieving at least a set of offers relating to said product, and the display of at least said set of offers.

In this way, a user can compare the different offers relating to a particular product, so that he/she can make an informed buying choice.

Furthermore, the offers may also relate to similar product, so that the user can make a more informed buying choice.

Further advantageous features of the present invention are the subject of the attached claims.

BRIEF DESCRIPTION OF THE DRAWINGS

The features of the invention are specifically set forth in the claims annexed to this description; such characteristics will be clearer from the following description of a preferred and non-exclusive embodiment shown in annexed drawings, wherein:

DETAILED DESCRIPTION OF THE PREFERRED EMBODIMENTS

In this description, any reference to "an embodiment" will indicate that a particular configuration, structure or feature described in regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake, and do not limit the protection scope or extension of the various embodiments.

Figure 1:
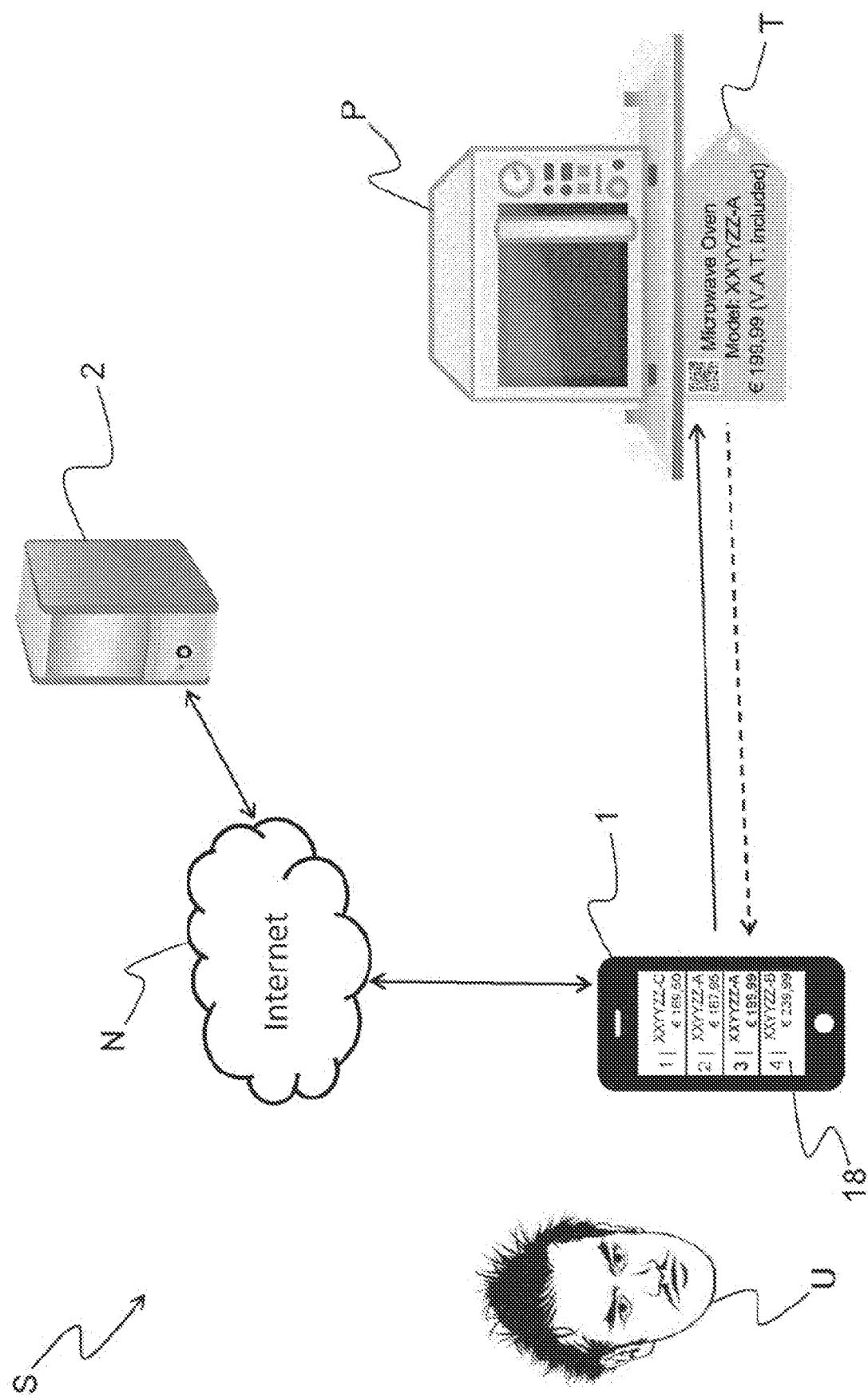
FIG. 1 shows a graphical representation of a system for comparing product offers comprising an apparatus according to the invention.

With reference to FIG. 1, a system S for comparing product offers comprises the following parts:

an apparatus 1 for comparing product offers according to the present invention, wherein said apparatus 1 is preferably a mobile phone, a tablet, a smartwatch, smart-glasses or the like, and is preferably adapted to execute a set of instruction implementing the method for comparing product offers according to the present invention; in particular, the apparatus 1 is configured for performing the following step:

a. acquiring product identification information that can be used to identify a product P (e.g., a microwave oven, a food processor, a vacuum cleaner, or the like);

b. using said product identification information for retrieving at least a set of offers relating to said product;

c. displaying at least part of said set of offers;

a remote device 2, e.g., a server, a personal computer, a micro pc, or the like, which is configured for providing at least a set of sale offers to the apparatus 1 when said apparatus 1 sends a request of information relating to a particular product P, wherein said request of information is generated on the basis of the acquired product identification information (e.g., by encapsulating said product identification information into an HTTP request).

The apparatus 1 and the remote device 2 are in signal communication through a telecommunication network (N), preferably a packet switching network (e.g., Internet or the like) and/or a circuit switching network (e.g., a landline network, a wireless network such as a GSM/UMTS/LTE mobile network, or the like).

The product identification information can be collected from or transmitted by the product P; more in details, the product P may have a particular shape or an identification mark on its external surface (e.g., a barcode, a QR code, a trademark, a model name inscription, or a similar ones), preferably an identifier encoded in a barcode or a QR code according to the European Article Number (EAN) specifications, which can be collected from the product P through a photograph taken through an image sensor (not shown in the attached figures) that is in signal communication with the acquisition means 14, and is preferably comprised in said apparatus 1.

Alternatively or in combination with that, the product P may also comprise an identification transmitter (e.g., a Bluetooth or Bluetooth Low energy interface, a RFID tag, a Near Field Communication interface, or the like) configured for transmitting the product identification information when said transmitter is powered and/or enquired by the apparatus 1. More in details, the identification transmitter may emit product identification information that comprises a string containing at least a product identifier, preferably encoded according the European Article Number specifications, which allows the identification of said product P.

Alternatively or in combination with the above-described features, the product identification information can be collected from or transmitted by a product tag T positioned on or close to said product P, e.g., the product tag T is attached to the shelf on which the product P is positioned; said product tag T may comprise a descriptive text written on it (usually together with the price of the product) and/or an identification code (e.g., a barcode, a QR code, or similar) and/or an identification transmitter similar to the one described above.

In this way, the apparatus 1 can acquire the product identification information, which allow to identify uniquely the product that the user U is interested in buying.

Figure 2:
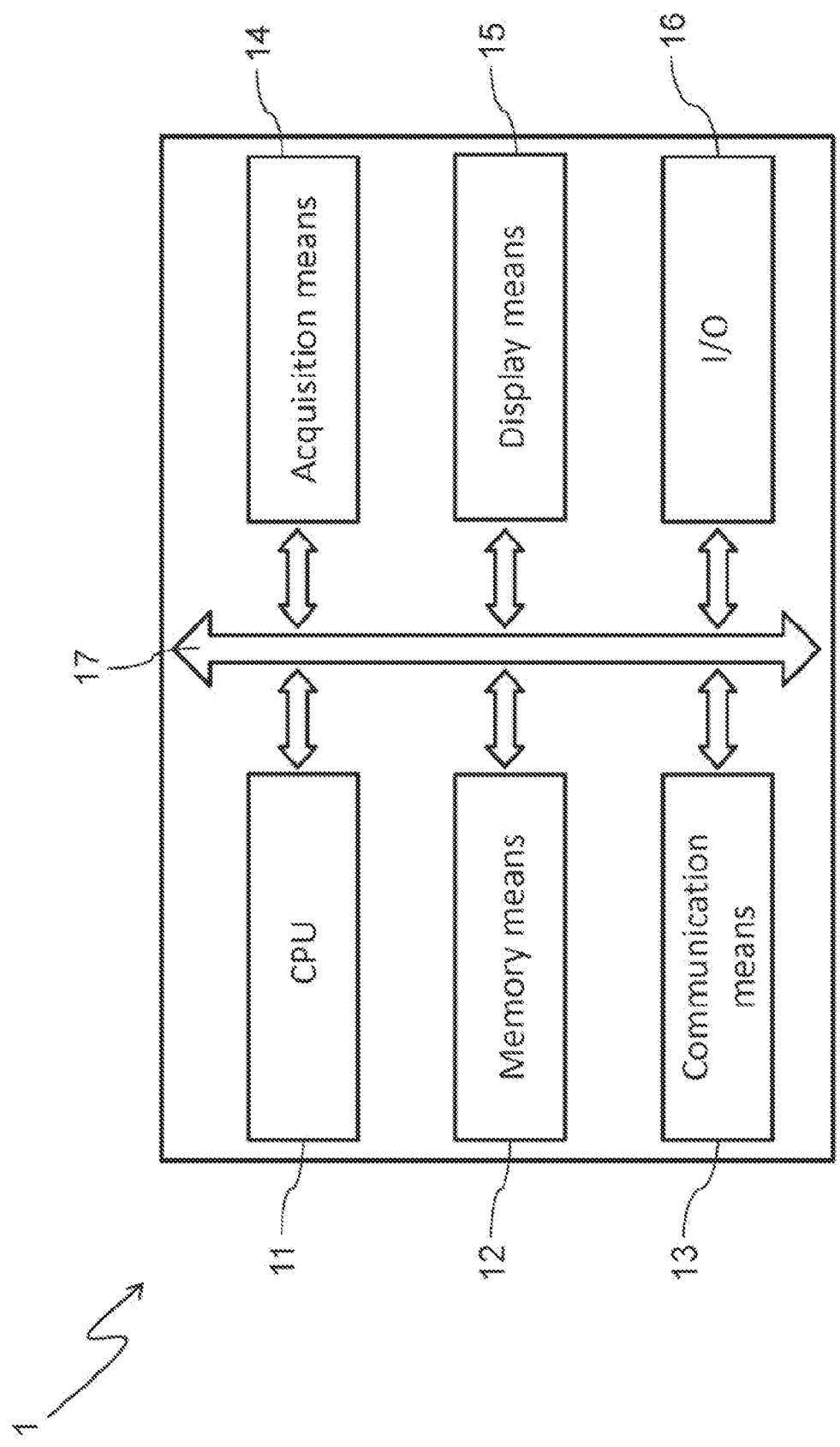
FIG. 2 shows a block diagram of the apparatus for comparing product offers depicted in FIG. 1.

With also reference to FIG. 2, the apparatus 1 comprises the following parts:
- control and/or processing means 11, like a Central Processing Unit (CPU), an FPGA, a CPLD, a microcontroller, or the like, configured for executing at least the set of instruction implementing the method according to the invention;
- memory means 12, adapted to contain at least the data and instructions (comprising the set of instruction implementing the method according to the invention) used by the other elements of the apparatus 1 and, in particular, by the control and/or processing means 11;
- communication means 13, preferably one or more network interfaces operating in accordance with a standard of the IEEE 802.3 (also known as Ethernet) and/or IEEE 802.11 (also known as WiFi) and/or 802.16 (also known as WiMax) families and/or an interface for a GSM/GPRS/UMTS/LTE data network, which allow the apparatus 1 to communicate with the remote device 2 through the network N;
- acquisition means 14 apt to receive product identification information that can be used to identify the product P; acquisition means 14 may comprise, for example, USB, Firewire, RS232, IEEE 1284, Ethernet, WiFi adapters, or the like;
- a displaying means 15 in signal communication with the control and/or processing means 11, and configured for receiving display instructions at its input, which are generated by the control and/or processing means 11, and outputting a video signal, which can, for example, be displayed by a display 18 comprised in said apparatus 1;
- input/output (I/O) means 16, which may be used, for example, for connecting said apparatus 1 to peripherals (e.g., an external screen or external mass storage units) or to a programming terminal configured for writing instructions (which the control and/or processing means 11 will have to execute) into the memory means 132; such input/output means 16 may comprise, for example, a USB, Firewire, RS232, IEEE 1284, or WiFi adapters, audio speaker, vibration generator, touch screen or the like;
- a communication bus 17, which allows the exchange of information among the control and/or processing means 11, the memory means 12, the communication means 13, the acquisition means 14, the displaying means 15, and the I/O means 16.

As an alternative to using the communication bus 17, the control and/or processing means 11, the memory means 12, the communication means 13, the acquisition means 14, the displaying means 15, and the I/O means 16 can be connected through a star architecture.

Figure 3:
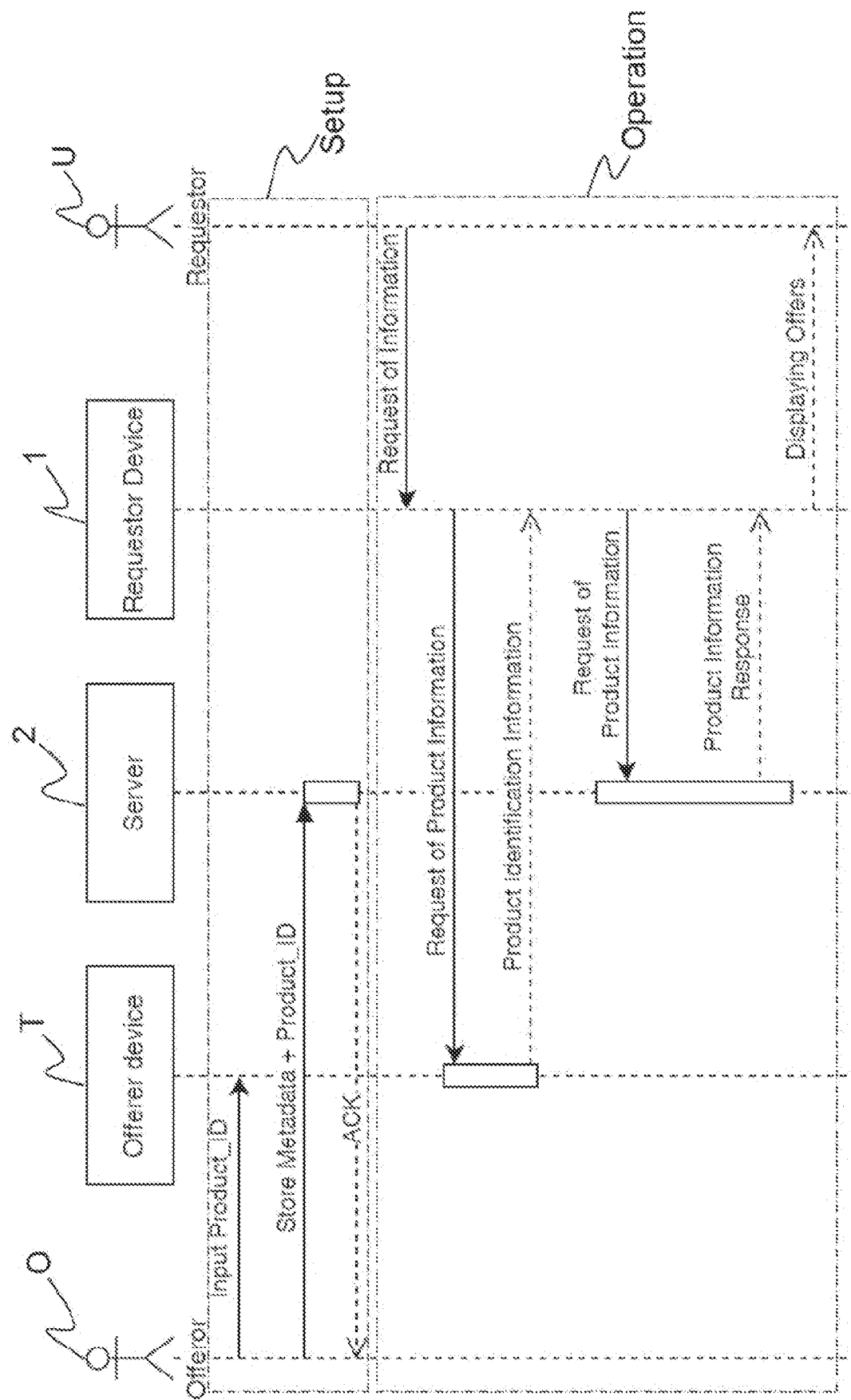
FIG. 3 shows a sequence diagram depicting the operations of the system shown in FIG. 1.

With reference to FIG. 3, the sequence diagram describes an operating session of a preferred embodiment of the system S, wherein the product identification information are stored in a product tag T which is then configured for transmitting said product identification information when said tag T is enquired (e.g., through a enquiry message) or powered (e.g., through an external electromagnetic field). For this purpose, the apparatus may comprise a communication device (not shown in the attached Figures), preferably a short range communication device (e.g., a wireless receiver/transceiver, such as an adapter for Bluetooth, NFC, WiFi, or any other short range communication standard), which is in signal communication with the acquisition means 14, and is configured for receiving the product identification information transmitted from the product tag T and/or the product P.

The sequence diagram depicts two different moments: the setup of a tag T, and the operation of the system S according the method of the present invention.

During the setup of a tag T, an offeror O sends to the tag a configuration message comprising the product identification information (e.g., the product identification code-product ID) associated to a particular product P. The configuration messages can be preferably generated and sent by a programming device (e.g., RFID reader/writer) in signal communication with an offeror device (e.g., a smartphone, a tablet, or the like) running an ad-hoc software apt to configure said product tag T. After that, the offeror O may preferably send, through said offeror device or another one, an offering message to the remote device (server) 2, wherein said offering message preferably comprises the same product identification information stored in the product tag T, and bid metadata, such as offering price, financing condition, possible discount(s), or the like. It highlighted that bid metadata are information useful to the user U for comparing the different offers relating to said product P to which the tag T is associated.

The remote device (server) 2 is configured for storing both the product identification information and the offering metadata; more in details, the server 2 is preferably configured for executing a software implementing DataBase Management System (DBMS) functionalities, which allows the creation of indexes, preferably for indexing the product identification information, so as to make possible the retrieval of all the bid metadata relating to a particular product (or a similar one) with a low time complexity, i.e., very quickly. Moreover, it is also possible indexing the bid metadata, so as to make possible searching for products having similar bid metadata (e.g., similar offering prices, technical features, financing conditions, discount(s), or the like).

When the remote device 2 is an operating condition, said remote device 2 preferably waits until a request of product information is received from an apparatus 1; after that, said remote device 2 preferably performs the following steps:
  executing a query against the database that returns a collection of bid metadata relating to the same product (or similar ones) identified by the product identification information;
  generating a product information response comprising at least a set of offers generated on the basis of the bid metadata, e.g., by encapsulating the said at least one set of offers in a HTTP response message;
  transmitting said product information response to said apparatus 1 through the network N.

When the apparatus 1 is in an operating condition, said apparatus 1 executes instructions that implement the method for comparing product offers which comprises the following phases:
  a. a receiving phase, wherein the product identification information relating to the product P are received through the acquisition means 14;
  b. a generating phase, wherein the request of product information is generated, by means of the control and/or processing means 11, on the basis of said product identification information;
  c. a transmitting phase, wherein the request of product information is transmitted, through the communication means 13, to at least one remote device 2 that is configured to generate, on the basis of said request of product information, a product information response comprising at least a set of offers relating to said product;
  d. a receiving phase, wherein the product information response generated by the remote device 2 is received through said communication means 13;
  e. a displaying phase, wherein at least part of one received set of offers is displayed through the displaying means 15.

In this way, the user U can compare the different offers relating to a particular product, so that he/she can make an informed buying choice.

The offeror can also specify bid metadata comprising position information, namely information specifying the location of each offer (e.g., the position of the shelf on which the offered product is positioned and/or the address and/or the coordinates of the shop), so the user U can see the position in which the product P (or a similar one) is offered at certain conditions. In this way, the user U can compare the different offers relating to a particular product, so that he/she can make an informed buying choice, also evaluating the distance between him/her and the offered products.

The remote device 2 may also store, preferably in a data warehouse, said product information response, before, during or after that said product information response has been sent to the apparatus 1, in order to make possible further analyses, e.g., business intelligence analyses.

Furthermore, the apparatus 1 may be configured for transmitting buying information to the remote device 2, wherein said buying information comprises the (final) buying choice made by the user, in order to make possible establishing which of the offers comprised in said product information response has been chosen by the user. More in details, the remote device 2 may also be configured to correlate at least part of the product information response (in particular the set of offers) with the buying information, preferably by adding a record into a table that implements a 1,1 relation between each of the two entities modeling the data comprised in the product information response and in said buying information.

The displaying means 15 are configured for generating a video signal that, when it is displayed on the display 18, depicts at least a portion of the set of offers received from the remote device 2, preferably in a tabular way (i.e., within a table).

The set of offers can be displayed in several other manners (e.g., using data trees, graph, or the like), without departing from the teaching of the present invention.

The set of offers can also include at least a link (e.g., a hyper textual link or the like) to a web page and/or a local application allowing to interact with an assistant, preferably an assistant of an online customer service, who can answer to customer questions. This assistant can be a human assistant, who is interacting with the customer in a chat and/or audio/video session, and/or a virtual assistant, namely a computer program which preferably comprises a set of instructions implementing an artificial intelligence algorithm (e.g., deep neural networks—DNN, or the like) that can be trained for understanding the questions of the user (which can be submitted in textual and/or audio format), and providing an answer to said questions.

In a first variant of the above-described preferred embodiment of the system S, the apparatus 1 is configured for sending request of product information to multiple remote device (similar to the remote device 2 of the preferred embodiment), which are preferably positioned close to the apparatus 1 (e.g., in a market stall), so that they are directly reachable by the apparatus 1, e.g., through a WiFi and/or Bluetooth connections.

This embodiment of the system S is particularly advantageous for being used in local markets, especially when a market is crowded, because a consumer may have difficulties in checking the price and selling conditions of a product at each market stall that is selling said product or a similar ones; furthermore, this embodiment is also advantageous when the consumer does not know the assignment of the sellers at the market stalls.

In a second variant of the preferred embodiment of the system S, the product identification information preferably comprise at least an image of at least a portion of the product, more preferably acquired by means of an image sensor comprised in an apparatus similar to the apparatus 1, and the remote device (similar to the remote device 2) is configured for identifying the product on the basis of said least an image, preferably by executing an image recognition algorithm, such as multilayered neural networks or the like, before executing al the steps described for the preferred embodiment.

This embodiment is particularly advantageous for products like fresh goods, such as fruit, vegetable, meat, fish, or the like, which is difficult to identify, especially when the product tags are missing, wrong, or incomplete; in fact, some of these product are sold within few hours after being harvested, catch, or slaughtered, and the sellers usually have no time to prepare very detailed product tags. In this way, the user can compare the different offers relating to fresh food products, so that he/she can make an informed buying choice also if he/she is not very expert in recognizing different types of fresh food.

The tasks performed by the remote device 2 in all the previously described embodiments may also be performed by another device (which may be comprised in the apparatus 1 according to the invention) or by a searching process executed by the apparatus 1 according to the present invention. More in details, the device or the apparatus 1 executing the searching process may be configured for executing the following steps:

a. receiving, through the network N, the request of product information;
b. recognizing, on the basis of said request of product information, a product identification code (preferably a string of characters) of the product P;
c. determining, on the basis of said product identification code, at least a set of offers relating to the product P;
d. generating a product information response comprising said at least one set of offers;
e. transmitting, through the network N, said product information response to said apparatus 1 and/or to another process executing the method according to the invention.

All the phases according to the method of the present invention may be performed by a mobile apparatus (e.g., a mobile phone, a smartphone, a tablet, a wearable device such as a smartwatch, smart-glasses, or the like) according to the state of art. Said mobile apparatus is configured for executing a software implementing all the phases of the method according to the invention; the set of instructions of said software can be stored into the memory of said terminal by the manufacturer, or can be downloaded from a server via a communication network (e.g., by downloading through the Internet an application from an online shop, such as Google Play©, App Store, or the like) and then stored/installed in the memory of said mobile apparatus.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. A system for comparing product offers, the system comprising:
   an apparatus comprising:
      a display for showing product offers to a user of the apparatus;
      a first processor;
      a first memory including instructions that, when executed by the first processor, cause the apparatus to:
         receive product identification information relating to a product that can be used to identify the product, wherein the product identification information is comprised in a product tag positioned on or close to the product, and wherein the product identification information is transmitted by an identification transmitter comprised in the product tag or in the product;
         generate a request of product information on the basis of the product identification information;
         transmit the request of product information to a server and to a plurality of devices in different stalls of a local market, the plurality of devices configured to generate, on the basis of the request of product information, product information responses comprising at least offers relating to the product;
         receive product information responses generated by the devices from the server; and
         display, through the display, the offers in a fashion that allows the user to compare the different offers relating to the product,
   wherein the server comprises:
   a second processor; and
   a second memory including instructions that, when executed by the second processor, cause the server to:
      receive offering metadata of a plurality of products from a plurality of offerer devices;
      index the offering metadata of the plurality of products by identification information of the plurality of products;
      store the indexed offering metadata of the plurality of products in a database that is accessible by the server, allowing faster retrieval of data based on product identification information;
      in response to receiving the request from the apparatus containing the identification information of the product, query the database based on the identification information of the product to retrieve the offering metadata of the product; and
      send the offering metadata of the product to the apparatus,
   wherein the offering metadata includes an offering price, a possible discount, location information of a store, and a position of a shelf where the product is positioned within the store, and
   wherein the product information response generated by the device comprises product information generated by the device as a result of the device acquiring product information of fresh goods using an image sensor to perform image recognition of the fresh goods.

2. The system according to claim 1, wherein the product identification information comprises a string containing at least a product identifier.

3. The system according to claim 1, wherein the product identification information further comprises an image of at least a portion of the surface of the product, and
   wherein the device is also configured to recognize the product on the basis of the image before or during the generation of the product information response.

4. The system according to claim 3, further comprising an image sensor, wherein the image sensor is configured for acquiring at least the image of at least a portion of the surface of the product or the product tag.

5. The system according to claim 1, wherein the product information response comprises position information that specifies the location of each offer.

6. The system according to claim 1, further comprising:
a device in communication with the apparatus through a network,
wherein the device is configured for:
  receiving, through the network, the request of product information;
  recognizing, on the basis of the request of product information, a product identification code of the product;
  determining, on the basis of the product identification code, at least a set of offers relating to the product;
  generating a product information response comprising the at least one set of offers; and
  transmitting, through the network, the product information response to the apparatus.

7. The system according to claim 1, wherein the offers comprise a link to interact with an assistant of an online customer service.

8. A method for comparing product offers, comprising:
receiving product identification information relating to a product,
  wherein the product identification information can be used to identify the product,
  wherein the product identification information is comprised in a product tag positioned on or close to the product, and
  wherein the product identification information is transmitted by an identification transmitter comprised in the product tag or in the product;
generating a request of product information on the basis of the product identification information;
transmitting the request of product information to a server and to a plurality of devices in different market stalls of a local market, the plurality of devices configured to generate, on the basis of the request of product information, product information responses comprising at least offers relating to the product;
receiving product information responses generated by the devices from the server; and
displaying the offers in a fashion that allows a user to compare the different offers relating to the product,
wherein the server is configured to:
  receive offering metadata of a plurality of products from a plurality of offerer devices;
  index the offering metadata of the plurality of products by identification information of the plurality of products;
  store the indexed offering metadata of the plurality of products in a database that is accessible by the server, allowing faster retrieval of data based on product identification information;
  in response to receiving the request from an apparatus containing the identification information of the product, query the database based on the identification information of the product to retrieve the offering metadata of the product; and
  send the offering metadata of the product to the apparatus, wherein the offering metadata includes an offering price, a possible discount, location information of a store, and a position of a shelf where the product is positioned within the store, and
wherein the product information response generated by the device comprises product information generated by the device as a result of the device acquiring product information of fresh goods using an image sensor to perform image recognition of the fresh goods.

9. A non-transitory computer readable storage medium comprising computer executable instructions that when executed by a processor cause the following to be performed:
receiving product identification information relating to a product,
  wherein the product identification information can be used to identify the product,
  wherein the product identification information is comprised in a product tag positioned on or close to the product, and
  wherein the product identification information is transmitted by an identification transmitter comprised in the product tag or in the product;
generating a request of product information on the basis of the product identification information;
transmitting the request of product information to a server, and to a plurality of devices in different market stalls of a local market, the plurality of devices configured to generate, on the basis of the request of product information, product information responses comprising at least offers relating to the product;
receiving product information responses generated by the devices from the server; and
displaying the offers in a fashion that allows a user to compare different offers relating to the product,
wherein the server is configured to:
  receive offering metadata of a plurality of products from a plurality of offerer devices;
  index the offering metadata of the plurality of products by identification information of the plurality of products;
  store the indexed offering metadata of the plurality of products in a database that is accessible by the server, allowing faster retrieval of data based on product identification information;
  in response to receiving the request from an apparatus containing the identification information of the product, query the database based on the identification information of the product to retrieve offering metadata of the product; and
  send the offering metadata of the product to the apparatus,
wherein the offering metadata includes an offering price, a possible discount, location information of a store, and a position of a shelf where the product is positioned within the store, and
wherein the product information response generated by the device comprises product information generated by the device as a result of the device acquiring product information of fresh goods using an image sensor to perform image recognition of the fresh goods.

* * * * *